US012784133B2

(12) United States Patent
Tsujino

(10) Patent No.: US 12,784,133 B2
(45) Date of Patent: Nov. 3, 2026

(54) DISPLAY CONTROL APPARATUS AND NON-TRANSITORY COMPUTER-READABLE STORAGE MEDIUM

(71) Applicant: TOYOTA JIDOSHA KABUSHIKI KAISHA, Toyota (JP)

(72) Inventor: Miki Tsujino, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 19/023,857

(22) Filed: Jan. 16, 2025

(65) Prior Publication Data

US 2025/0259262 A1 Aug. 14, 2025

(30) Foreign Application Priority Data

Feb. 14, 2024 (JP) ................................ 2024-020614

(51) Int. Cl.

*G06T 3/40* (2024.01)
*B60Q 9/00* (2006.01)
*G06T 11/10* (2026.01)

(52) U.S. Cl.

CPC .................. *G06T 3/40* (2013.01); *B60Q 9/00* (2013.01); *G06T 11/10* (2026.01)

(58) Field of Classification Search

CPC ........ B60K 2360/171; B60K 2360/179; B60K 35/22; B60K 35/23; G06T 11/10; G06T 3/40; B60Q 9/00; B60Q 9/007

See application file for complete search history.

(56) References Cited

U.S. PATENT DOCUMENTS

| | | | | |
|---|---|---|---|---|
| 10,933,812 | B1 * | 3/2021 | Nagasawa | B60K 35/22 |
| 2015/0234580 | A1 * | 8/2015 | Secord | B60C 23/02 715/771 |
| 2018/0157038 | A1 * | 6/2018 | Kabe | B60K 35/28 |
| 2018/0297520 | A1 * | 10/2018 | Morimura | B60Q 9/008 |
| 2019/0196184 | A1 * | 6/2019 | Takizawa | B60K 35/10 |
| 2020/0189614 | A1 * | 6/2020 | Ito | B60W 30/0956 |
| 2022/0009495 | A1 * | 1/2022 | Toyoura | B60K 35/10 |
| 2022/0080827 | A1 * | 3/2022 | Sung | B60K 35/10 |
| 2022/0305912 | A1 * | 9/2022 | Yokochi | B60K 35/22 |
| 2024/0246413 | A1 * | 7/2024 | Tsujino | B60K 35/00 |
| 2025/0218108 | A1 * | 7/2025 | Yamamoto | G06T 15/10 |
| 2025/0242827 | A1 * | 7/2025 | Ito | B60W 50/14 |

FOREIGN PATENT DOCUMENTS

| | | | | |
|---|---|---|---|---|
| CN | 113752945 A | * 12/2021 | | G06T 11/23 |
| DE | 19940723 A1 | * 3/2001 | | G08G 1/0962 |
| DE | 102013103877 A1 | * 10/2014 | | B60K 35/28 |

(Continued)

*Primary Examiner* — Babar Sarwar

(74) *Attorney, Agent, or Firm* — Oblon, McClelland, Maier & Neustadt, L.L.P.

(57) ABSTRACT

A display control apparatus includes an acquisition unit configured to acquire a detection result of a target around a host vehicle and a detection result of a distance from the host vehicle to the target, and a controller configured to execute control to display a host vehicle image simulating the host vehicle and an icon indicating a place where the target around the host vehicle is present and display the icon in a size changed according to the detection result of the target and the detection result of the distance from the host vehicle to the target.

9 Claims, 9 Drawing Sheets

(56) References Cited

FOREIGN PATENT DOCUMENTS

| | | | | | |
|---|---|---|---|---|---|
| DE | 102017202115 | A1 | * | 8/2017 | B60K 35/235 |
| DE | 102005046756 | B4 | * | 10/2017 | B60W 30/16 |
| JP | 2007-276559 | A | | 10/2007 | |
| JP | 2017173840 | A | * | 9/2017 | |
| JP | 2025098445 | A | * | 7/2025 | B60R 1/22 |
| JP | 2025117029 | A | * | 8/2025 | B60K 35/23 |
| KR | 20210005428 | A | * | 1/2021 | B60W 40/02 |
| KR | 20240116391 | A | * | 7/2024 | G08G 1/052 |
| WO | WO-2014208081 | A1 | * | 12/2014 | G02B 27/0101 |
| WO | WO-2020039678 | A1 | * | 2/2020 | B60K 35/80 |
| WO | WO-2024084870 | A1 | * | 4/2024 | G06T 11/23 |

* cited by examiner

| DISTANCE TO TARGET | ICON DISPLAY (CORNER) | ICON DISPLAY (FRONT AND REAR) | ALARM SOUND |
|---|---|---|---|
| NOT DETECTED |  |  | NO SOUND |
| FRONT: 200 TO 100<br>REAR: 200 TO 150<br>CORNER: 200 TO 60 |  |  | |
| FRONT: 100 TO 60<br>REAR: 150 TO 60 | — |  | INTERMITTENT SOUND |
| FRONT: 60 TO 45<br>REAR: 60 TO 45<br>CORNER: 60 TO 45 |  |  | FAST INTERMITTENT SOUND |
| FRONT: 45 TO 30<br>REAR: 45 TO 30<br>CORNER: 45 TO 30 |  |  | EXTREMELY FAST INTERMITTENT SOUND |
| 30 OR SHORTER |  |  | CONTINUOUS SOUND |

DISPLAY CONTROL APPARATUS AND NON-TRANSITORY COMPUTER-READABLE STORAGE MEDIUM

CROSS-REFERENCE TO RELATED APPLICATION

This application claims priority to Japanese Patent Application No. 2024-020614 filed on Feb. 14, 2024, incorporated herein by reference in its entirety.

BACKGROUND

1. Technical Field

The disclosure relates to a display control apparatus and a non-transitory computer-readable storage medium.

2. Description of Related Art

Japanese Unexamined Patent Application Publication No. 2007-276559 (JP 2007-276559 A) describes a technology to detect an obstacle with clearance sonars and display the position of the detected obstacle on a display according to a positional relationship with a host vehicle. More specifically, JP 2007-276559 A describes that six lights are provided at the front and rear sides of the figure of a vehicle, the light(s) is/are turned on according to the position(s) of the clearance sonar(s) having detected an obstacle, and turning on and blinking of the light(s) are switched according to a distance to the obstacle.

SUMMARY

The position of an obstacle detected by at least one of the clearance sonars is displayed by the light(s), and a distance to the detected obstacle is displayed by turning on and blinking of the light(s). Since a distance to the detected obstacle is displayed by turning on and blinking of the light(s), only whether an obstacle is detected and whether a distance to the obstacle becomes a predetermined distance are known. There is still room for improvement to display a distance to a target, such as an obstacle, in a stepwise manner and notify an occupant of a degree of urgency.

The disclosure is made in consideration of the above fact and provides a display control apparatus and a non-transitory computer-readable storage medium that are capable of displaying a distance to a target in a stepwise manner and notifying an occupant of a degree of urgency.

A first aspect of the disclosure provides a display control apparatus. The display control apparatus includes an acquisition unit configured to acquire a detection result of a target around a host vehicle and a detection result of a distance from the host vehicle to the target, and a controller configured to execute control to display a host vehicle image simulating the host vehicle and an icon indicating a place where the target around the host vehicle is present and display the icon in a size changed according to the detection result of the target and the detection result of the distance from the host vehicle to the target.

According to the first aspect, the acquisition unit acquires a detection result of a target around the host vehicle and a detection result of a distance from the host vehicle to the target.

Then, the controller executes control to display a host vehicle image simulating the host vehicle and an icon indicating a place where the target around the host vehicle is present and display the icon in a size changed according to the detection result of the target and the detection result of the distance from the host vehicle to the target. Thus, a degree of urgency can be expressed by a change in the size of the icon, so it is possible to display a distance from the host vehicle to a target in a stepwise manner and notify an occupant of the degree of urgency.

In the display control apparatus according to the above aspect, the controller may be configured to display the icon in a filled state and display a border enclosing the icon such that the border increases in size as the distance reduces.

According to the above aspect, the presence of a target can be expressed by displaying an icon, and a degree of urgency can be expressed by the size of the border including the icon.

In the display control apparatus according to the above aspect, the controller may be configured to display the icon such that an area of the icon increases as the distance reduces.

According to the above aspect, the presence of a target can be expressed by displaying an icon, and a degree of urgency can be expressed by the size of the area of the icon.

In the display control apparatus according to the above aspect, the icon may be a circular arc figure provided at a position corresponding to a detecting unit around the host vehicle image simulating the host vehicle, and the detecting unit may be configured to detect the target.

According to the above aspect, the position of a target with respect to the host vehicle can be checked with the icon displayed.

In the display control apparatus according to the above aspect, the controller may be configured to further change a blinking rate of the icon according to a changed size of the icon.

According to the above aspect, the presence of a target can be notified by displaying an icon, and a degree of urgency can be expressed by a blinking rate of the icon.

In the display control apparatus according to the above aspect, the controller may be configured to increase the blinking rate as the distance reduces.

According to the above aspect, since the blinking rate of an icon increases as the distance from the host vehicle to a target reduces, the fact that the target is approaching can be notified.

In the display control apparatus according to the above aspect, the controller may be configured to change a color of the icon according to a changed size of the icon.

According to the above aspect, since the color of an icon is changed according to the size of the icon, the fact that the target is approaching can be notified.

In the display control apparatus according to the above aspect, the controller may be configured to display a color indicating a higher degree of urgency as the distance reduces.

According to the above aspect, the presence of a target can be notified by displaying an icon, and a degree of urgency can be expressed by a color of the icon.

The display control apparatus according to the above aspect may further include an alarm configured to emit an alarm sound, and the controller may be configured to further control the alarm such that the alarm outputs a sound according to a changed size of the icon.

According to the above aspect, since an alarm sound is further emitted according to a changed size of an icon, a distance from the host vehicle to a target can be notified in a stepwise manner and a degree of urgency can be notified of an occupant by using both display and sound not by display only.

In the display control apparatus according to the above aspect, the controller may be configured to control the alarm such that an interval of an intermittent sound reduces as the distance reduces.

According to the above aspect, since the interval of an intermittent sound shortens as the distance from the host vehicle to the target reduces, the fact that the target is approaching can be notified.

A second aspect provides a non-transitory computer-readable storage medium. The non-transitory computer-readable storage medium stores code causing a computer to execute a process. The process includes acquiring a detection result of a target around a host vehicle and a detection result of a distance from the host vehicle to the target, displaying a host vehicle image simulating the host vehicle and an icon indicating a place where the target around the host vehicle is present, and displaying the icon in a size changed according to the detection result of the target and the detection result of the distance from the host vehicle to the target.

According to the above aspect, it is possible to provide a non-transitory computer-readable storage medium capable of causing a computer to execute display control for displaying a distance from the host vehicle to a target in a stepwise manner and notifying an occupant of a degree of urgency.

As described above, according to the aspects of the disclosure, it is possible to provide a display control apparatus and a non-transitory computer-readable storage medium that are capable of displaying a distance from the host vehicle to a target in a stepwise manner and notifying an occupant of a degree of urgency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
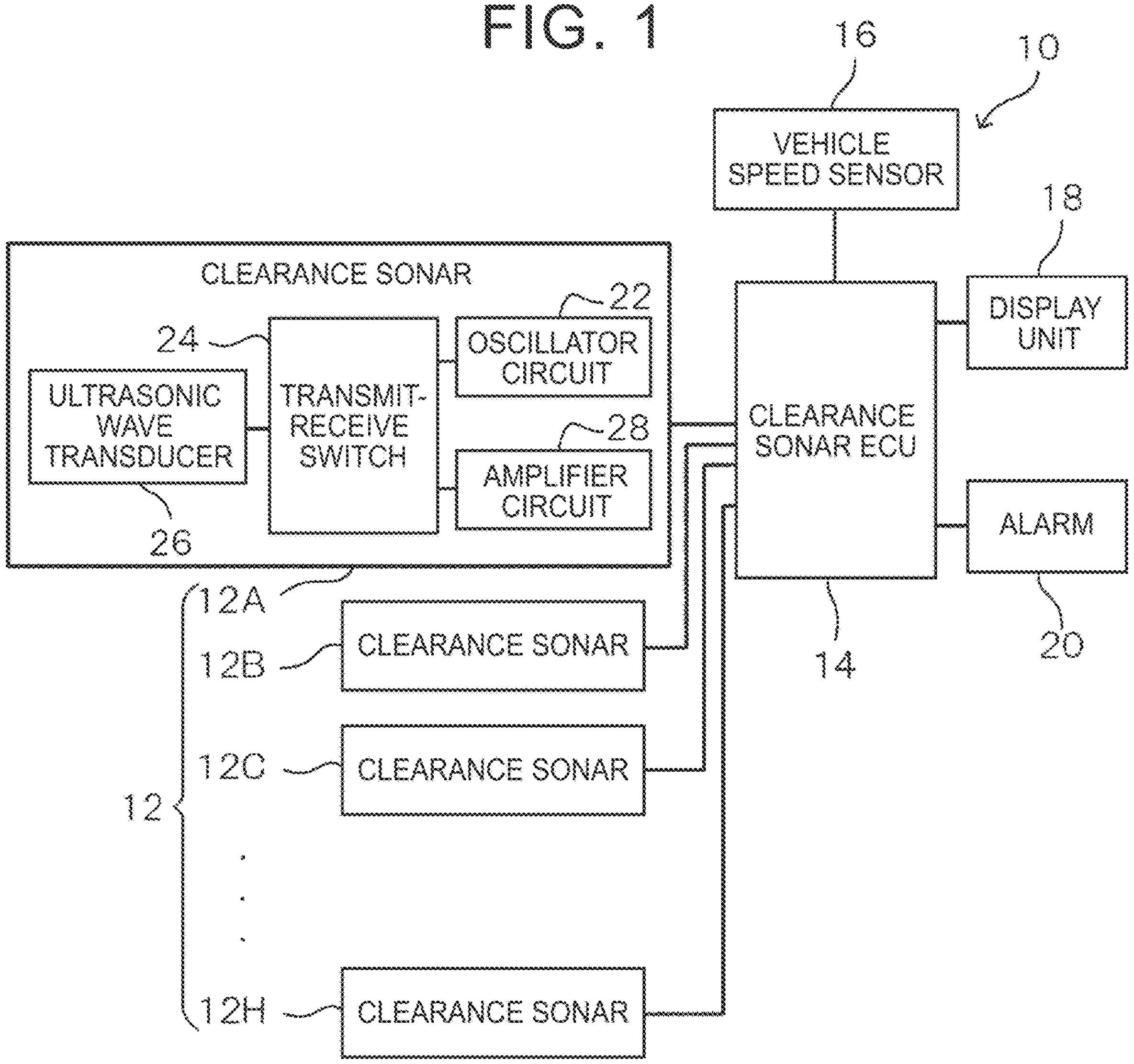
FIG. 1 is a block diagram that shows the schematic configuration of a display control apparatus according to an embodiment.

Hereinafter, example embodiments of the disclosure will be described with reference to the accompanying drawings. FIG. 1 is a block diagram that shows the schematic configuration of a display control apparatus according to the present embodiment.

A display control apparatus 10 according to the present embodiment detects a target, such as an obstacle, around a vehicle and a distance to the target by receiving reflected waves of ultrasonic waves transmitted to around the vehicle and notifies a driver of the presence or absence of a target and a distance to the target based on detection results.

As shown in FIG. 1, the display control apparatus 10 includes a plurality of clearance sonars 12A, 12B, 12C, 12D, 12E, 12F, 12G, 12H as examples of the detecting unit, a clearance sonar ECU 14 serving as an example of the acquisition unit and the controller, a vehicle speed sensor 16, a display unit 18, and an alarm 20.

Each of the clearance sonars 12A, 12B, 12C, 12D, 12E, 12F, 12G, 12H individually detects a target around the vehicle on a similar principle; however, a detection distance, a detection range, and the like are adjustable for each or some of the clearance sonars 12. Hereinafter, the clearance sonars 12A, 12B, 12C, 12D, 12E, 12F, 12G, 12H are referred to as clearance sonars 12 when not distinguished from one another.

Figure 2:
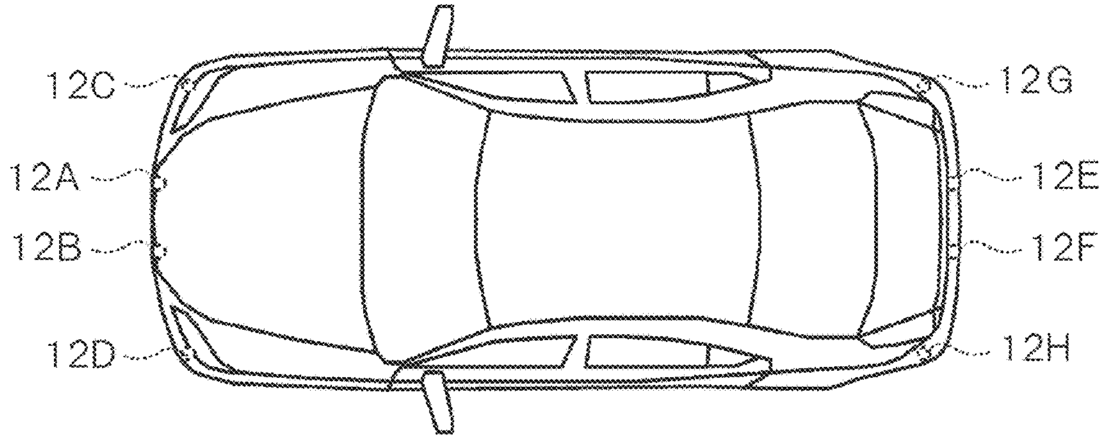
FIG. 2 is a view that schematically shows an example of positions where clearance sonars are disposed in a vehicle.

FIG. 2 is a view that schematically shows an example of positions where the clearance sonars 12A, 12B, 12C, 12D, 12E, 12F, 12G, 12H are disposed in the vehicle. In the following description, it is assumed that, in the vehicle shown in FIG. 2, the upper side of FIG. 2 is a right-hand side and the lower side of FIG. 2 is a left-hand side.

In the present embodiment, the clearance sonar 12A is disposed substantially at a right-hand side in a center in a vehicle width direction in a front bumper, and the clearance sonar 12B is disposed substantially at a left-hand side in the center in the vehicle width direction in the front bumper.

The clearance sonar 12C is disposed at a right-hand corner in the front bumper. The clearance sonar 12D is disposed at a left-hand corner in the front bumper.

The clearance sonar 12E is disposed substantially at a right-hand side in the center in the vehicle width direction in a rear bumper, and the clearance sonar 12F is disposed substantially at a left-hand side in the center in the vehicle width direction in the rear bumper.

The clearance sonar 12G is disposed at a right-hand corner in the rear bumper, and the clearance sonar 12H is disposed at a left-hand corner in the rear bumper.

In the present embodiment, the clearance sonars 12A, 12B, 12E, 12F disposed at the center in the vehicle width direction are longer in detection distance and wider in detection range than the clearance sonars 12C, 12D, 12G, 12H disposed at the corners.

In the present embodiment, each of the clearance sonars 12A, 12B, 12E, 12F disposed at the center in the vehicle width direction detects a distance to a target in predetermined five-step distances. In an example, each of the front-side clearance sonars 12A, 12B detects a distance to a target in five steps, that is, 200 cm to 100 cm, 100 cm to 60 cm, 60 cm to 45 cm, 45 cm to 30 cm, and 30 cm or shorter. Each of the rear-side clearance sonars 12E, 12F detects a distance to a target in five steps, that is, 200 cm to 150 cm, 150 cm to 60 cm, 60 cm to 45 cm, 45 cm to 30 cm, and 30 cm or shorter.

On the other hand, each of the clearance sonars 12C, 12D, 12G, 12H disposed at the corners detects a distance to a target in predetermined four steps. In an example, each of the clearance sonars 12C, 12D, 12G, 12H detects a distance to a target in four steps, that is, 200 cm to 60 cm, 60 cm to 45 cm, 45 cm to 30 cm, and 30 cm or shorter.

The detection distance of each of the clearance sonars 12 is not limited thereto and is adjustable as needed.

Each of the clearance sonars 12 includes an oscillator circuit 22, a transmit-receive switch 24, an ultrasonic wave transducer 26, and an amplifier circuit 28.

The oscillator circuit 22 is a circuit that generates ultrasonic waves with a predetermined waveform and amplitude. The oscillator circuit 22 is connected to the ultrasonic wave transducer 26 via the transmit-receive switch 24.

The transmit-receive switch 24 is a switching circuit that switches the ultrasonic wave transducer 26 between transmission and reception of ultrasonic waves.

The amplifier circuit 28 amplifies a voltage caused by reflected waves received by the ultrasonic wave transducer 26 and inputs the voltage to the clearance sonar ECU 14.

The ultrasonic wave transducer 26 has a cylindrical housing. In the ultrasonic wave transducer 26, a piezoelectric vibration element made up of piezoelectric ceramic is disposed at a bottom of the cylindrical part. Once a high-frequency voltage that causes resonant vibration is applied to the piezoelectric vibration element, ultrasonic waves are transmitted from the bottom. If there is a target therearound, reflected waves reflected from the target vibrate the piezoelectric vibration element, and a voltage that occurs due to the vibration can be detected.

Figure 3:
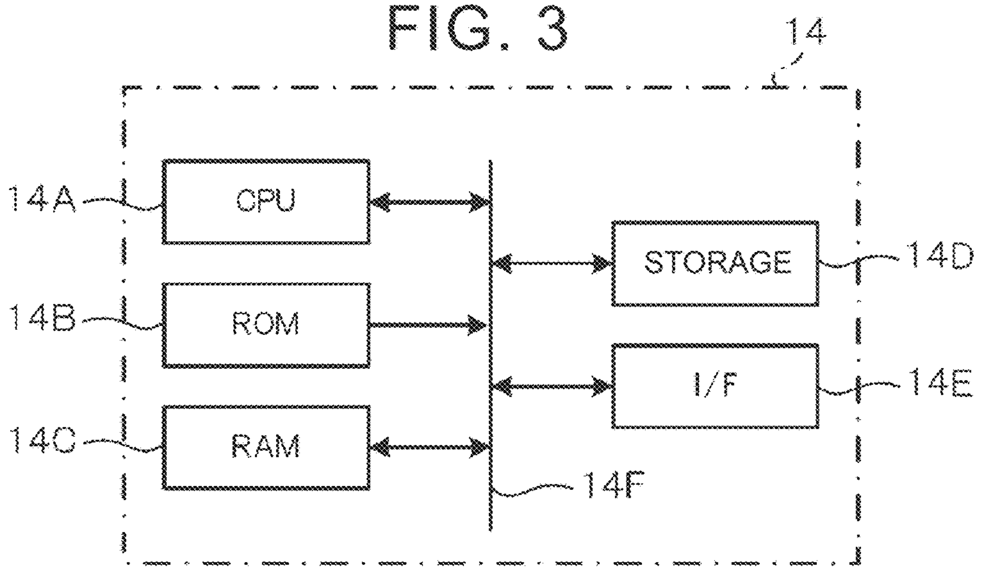
FIG. 3 is a block diagram that shows the schematic configuration of a clearance sonar ECU.

As shown in FIG. 3, the clearance sonar ECU 14 is made up of a general microcomputer including a central processing unit (CPU) 14A, a read only memory (ROM) 14B, a random access memory (RAM) 14C, a storage 14D, an interface (I/F) 14E, a bus 14F, and the like. FIG. 3 is a block diagram that shows the schematic configuration of the clearance sonar ECU 14.

The CPU 14A is a central processing unit and governs the operation of the whole apparatus by executing various programs. Various control programs such as a vehicle display program, various parameters, and the like are stored in advance in the ROM 14B. The RAM 14C is used as a work area or the like while the CPU 14A is running various programs. The storage 14D is made up of various storage units, such as a hard disk drive (HDD), a solid state drive (SSD), and a flash memory. Various pieces of data, application programs, and the like are stored in the storage 14D. The I/F 14E is allowed to connect with a vehicle network and transmits and receives various pieces of data with other various ECUs connected to the vehicle network. The above-described units of the clearance sonar ECU 14 are electrically connected to one another by the bus 14F.

In the present embodiment, the CPU 14A acquires detection results of the clearance sonars 12 by running the display control program stored in the ROM 14 to detect a target around the vehicle and detect a distance to the target from the vehicle. When a target is detected, the CPU 14A controls the display unit 18 and the alarm 20 to execute control to notify a driver of the presence of the target. More specifically, the CPU 14A controls the display unit 18 such that the display unit 18 displays icons in sizes each changed according to a detection result of a target and a detection result of a distance to the target by a corresponding one of the clearance sonars 12A, 12B, 12C, 12D, 12E, 12F, 12G, 12H. The CPU 14A controls the alarm 20 such that the alarm 20 outputs a sound according to a changed size of the icon.

The vehicle speed sensor 16, for example, measures an hourly speed when protrusions installed at certain intervals on the circumference of a rotor provided at each wheel passes as a pulse and measures a vehicle speed for each wheel based on the number of pulses per unit time.

A combination meter provided at an instrument panel, a multimedia display that displays various pieces of information, a head up display (HUD), or the like is applied as the display unit 18. The display unit 18 displays a detection result of a target around the vehicle.

The alarm 20 is a buzzer or an output device that outputs an electronic sound. The alarm 20 is controlled by the clearance sonar ECU 14 so as to output an electronic sound according to a distance to a target. For example, as a detected target approaches, the alarm 20 changes an electronic sound in a stepwise manner like slow intermittent sound, intermittent sound, fast intermittent sound, and continuous sound and emits the electronic sound. Therefore, a driver is able to grasp the direction of an obstacle present through the display unit 18 and grasp a distance to the obstacle through an alert from the alarm 20. By notifying a distance to a target with a sound more specifically, the driver is able to reduce the number of times to change its line of sight to the display unit 18 and is able to concentrate on driving the vehicle.

Figure 4:
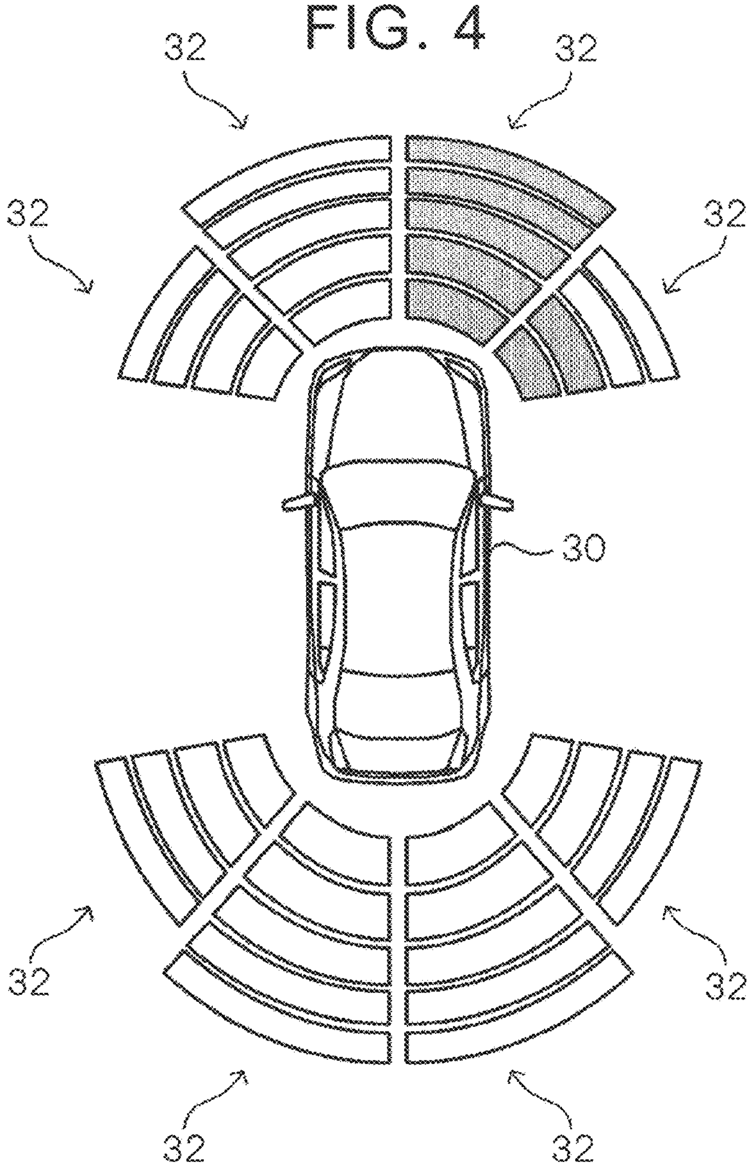
FIG. 4 is a view that shows an example of an image displayed on a display unit.

Next, an image displayed on the display unit 18 will be described. FIG. 4 is a view that shows an example of an image displayed on the display unit 18.

As shown in FIG. 4, a host vehicle image 30 simulating the host vehicle and the icons 32 indicating a place where a target around the host vehicle is present are displayed on the display unit 18. Each of the icons 32 is displayed with circular arc figures provided in correspondence with a corresponding one of the clearance sonars 12 around the host vehicle image 30. Each of the icons 32 is displayed in a size corresponding to a detection distance and detection range of a corresponding one of the clearance sonars 12. FIG. 4 shows a display example of the icons 32 in a case where a target is detected by the clearance sonars 12A, 12C.

In the present embodiment, a substantially fan-shaped figure can be displayed by five circular arc figures for each of the clearance sonars 12A, 12B, 12E, 12F at the center in the vehicle width direction, and a substantially fan-shaped figure can be displayed by four circular arc figures for each of the clearance sonars 12C, 12D, 12G, 12H at the corners. Circular arc figures at positions corresponding to the clearance sonars 12 having detected a target are displayed. The substantially fan-shaped icon 32 is displayed in a size changed by increasing the number of circular arc figures displayed as a distance to a detected target reduces to display the icon 32 with a larger area. As the number of the clearance sonars 12 that detect a target increases (the detection range widens), the icons 32 are displayed with a larger area.

Figure 5:
FIG. 5 is a table that shows a specific example of a correlation between a distance to a target detected and the number of circular arc figures displayed.
Figure 5:
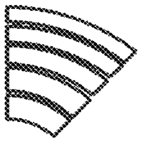
Figure 5:
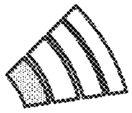
Figure 5:
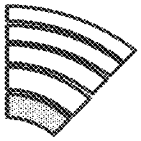
Figure 5:
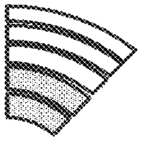
Figure 5:
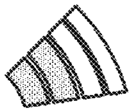
Figure 5:
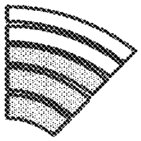
Figure 5:
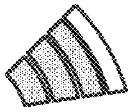
Figure 5:
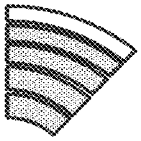
Figure 5:
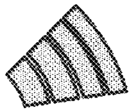
Figure 5:
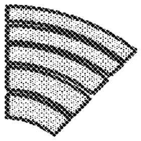

Specifically, as shown in FIG. 5, the icon 32 is displayed with a changed number of circular arc figures displayed according to a distance to a detected target. FIG. 5 is a table that shows a specific example of a correlation between a distance to a target detected and the number of circular arc figures displayed. It is assumed that halftone circular arc figures in FIG. 5 indicate a displayed state and outline circular arc figures indicate a non-displayed state. In the table, icon display (corner) corresponds to a detection result of each of the clearance sonars 12C, 12D, 12G, 12H. Icon display (front and rear) corresponds to a detection result of each of the clearance sonars 12A, 12B, 12E, 12F.

In the present embodiment, in a case where a distance to a target detected by any one of the front-side clearance sonars 12A, 12B ranges from 200 cm to 100 cm, a case where a distance to a target detected by any one of the rear-side clearance sonars 12E, 12F ranges from 200 cm to 150 cm, or a case where a distance to a target detected by any one of the corner clearance sonars 12C, 12D, 12G, 12H ranges from 200 cm to 60 cm, one of the circular arc figures, closer to the host vehicle image 30, is displayed as shown in FIG. 5. At this time, an alarm sound is not emitted from the alarm 20.

In a case where a distance to a target detected by any one of the front-side clearance sonars 12A, 12B ranges from 100 cm to 60 cm or a case where a distance to a target detected by any one of the rear-side clearance sonars 12E, 12F ranges from 150 cm to 60 cm, two of the circular arc figures, closer to the host vehicle image 30, are displayed as shown in FIG. 5. At this time, an intermittent sound with a predetermined first interval is emitted from the alarm 20 as an alarm sound.

In a case where a distance to a target detected by any one of the front-side clearance sonars 12A, 12B or any one of the rear-side clearance sonars 12E, 12F ranges from 60 cm to 45 cm, three of the circular arc figures, closer to the host vehicle image 30, are displayed as shown in FIG. 5. At this time, a fast intermittent sound is emitted by the alarm 20 as an alarm sound.

In a case where a distance to a target detected by any one of the corner clearance sonars 12C, 12D, 12G, 12H ranges from 60 cm to 45 cm, two of the circular arc figures, closer to the host vehicle image 30, are displayed as shown in FIG. 5. At this time, a fast intermittent sound with a second interval shorter than the first interval is emitted by the alarm 20 as an alarm sound.

In a case where a distance to a target detected by any one of the front-side clearance sonars 12A, 12B or any one of the rear-side clearance sonars 12E, 12F ranges from 45 cm to 30 cm, four of the circular arc figures, closer to the host vehicle image 30, are displayed as shown in FIG. 5. At this time, an extremely fast intermittent sound with a third interval shorter than the second interval is emitted by the alarm 20 as an alarm sound.

In a case where a distance to a target detected by any one of the corner clearance sonars 12C, 12D, 12G, 12H ranges from 45 cm to 30 cm, three of the circular arc figures, closer to the host vehicle image 30, are displayed as shown in FIG. 5. At this time, an extremely fast intermittent sound with a fourth interval shorter than the third interval is emitted by the alarm 20 as an alarm sound.

In a case where a distance to a target detected by any one of the front-side clearance sonars 12A, 12B or any one of the rear-side clearance sonars 12E, 12F is 30 cm or shorter, five of the circular arc figures, closer to the host vehicle image 30, are displayed as shown in FIG. 5. At this time, a continuous sound is emitted by the alarm 20 as an alarm sound.

In a case where a distance to a target detected by any one of the corner clearance sonars 12C, 12D, 12G, 12H is 30 cm or shorter, four of the circular arc figures, closer to the host vehicle image 30, are displayed as shown in FIG. 5. At this time, a continuous sound is emitted by the alarm 20 as an alarm sound.

When the icon 32 is displayed, a blinking rate of the icon 32 may be further changed according to a changed size of the icon 32. Thus, the presence of a target can be notified by displaying the icon 32, and a degree of urgency can be expressed by the blinking rate of the icon. In this case, the blinking rate of the icon 32 may be increased as a distance to a detected target reduces. Thus, since the blinking rate of the icon 32 increases as the distance to a target reduces, the fact that the target is approaching can be notified.

When the icon 32 is displayed, a color of the icon 32 may be further changed according to a changed size of the icon 32. Thus, since the color of the icon is changed according to the size of the icon 32, the fact that the target is approaching can be notified. In this case, a color indicating a higher degree of urgency may be displayed as a distance to a detected target reduces. For example, as a distance to a target reduces, a red color may be displayed as a color indicating a higher degree of urgency; whereas a yellow color may be displayed as a distance to a target increases. Thus, the presence of a target can be notified by displaying the icon, and a degree of urgency can be expressed by the color of the icon 32.

The color and blinking rate of the icon 32 may be changed according to a changed size of the icon 32.

Figure 6:
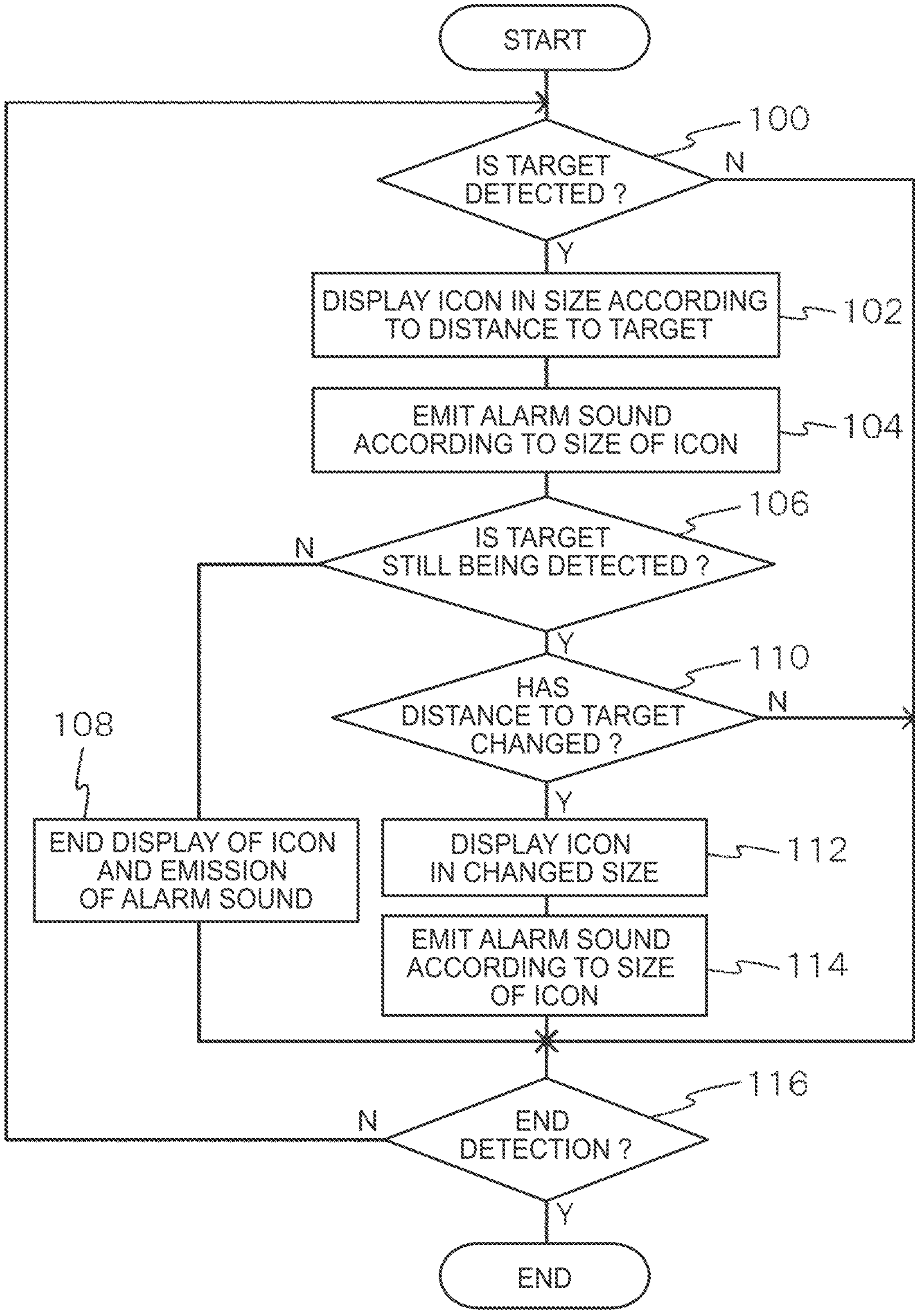
FIG. 6 is a flowchart that shows an example of the flow of a process that is executed in the clearance sonar ECU of the display control apparatus according to the present embodiment.

Next, a specific process that is executed by the clearance sonar ECU 14 of the display control apparatus 10 according to the present embodiment configured as described above will be described. FIG. 6 is a flowchart that shows an example of the flow of a process that is executed in the clearance sonar ECU 14 of the display control apparatus 10 according to the present embodiment. The process of FIG. 6 is started when, for example, setting to detect a target with the clearance sonars 12 is performed and a vehicle speed detected by the vehicle speed sensor 16 is lower than or equal to a predetermined vehicle speed. Alternatively, the process of FIG. 6 is started when an ignition switch (not shown) is turned on in a state where the setting has been performed and a vehicle speed detected by the vehicle speed sensor 16 is lower than or equal to a predetermined vehicle speed.

In step 100, the CPU 14A determines whether a target is detected. The determination acquires detection results of the clearance sonars 12 and determines whether a target around the vehicle is detected from the acquired detection results. When the determination is negative, the process proceeds to step 116; whereas, when the determination is affirmative, the process proceeds to step 102.

In step 102, the CPU 14A displays the icon 32 in a size according to a distance to the target, and the process proceeds to step 104. In other words, the icon 32 at the position corresponding to the clearance sonar 12 having detected the target is displayed on the display unit 18 in a size (the number of circular arc figures) according to a distance to the target as shown in FIG. 5.

In step 104, the CPU 14A emits an alarm sound according to the size of the icon 32, and the process proceeds to step 106. In other words, as shown in FIG. 5, the alarm 20 is controlled so as to emit an alarm sound adapted to the size (the number of circular arc figures) of the icon 32 displayed.

In step 106, the CPU 14A determines whether the target is still being detected (that is, whether the target is not detected). The determination determines whether the target detected by the clearance sonar 12 is still being detected. When the determination is affirmative, the process proceeds to step 110; whereas, when the determination is negative, the process proceeds to step 108.

In step 108, the CPU 14A ends display of the icon 32 and emission of the alarm sound, and the process proceeds to step 116.

On the other hand, in step 110, the CPU 14A determines whether the distance to the detected target has changed. When the determination is negative, the process proceeds to step 116; whereas, when the determination is affirmative, the process proceeds to step 112.

In step 112, the CPU 14A changes the size of the icon 32, and the process proceeds to step 114. In other words, the icon 32 is displayed such that the size (the number of circular arc figures) is changed according to a distance to the detected target.

In step 114, the CPU 14A emits an alarm sound according to the size of the icon 32, and the process proceeds to step 116. In other words, the alarm 20 is controlled so as to emit an alarm sound with an interval of intermittent sound, changed according to a changed size of the icon 32. For example, as shown in FIG. 5, an alarm sound is emitted with an interval of intermittent sound, adapted to the size (the number of circular arc figures displayed) of the icon 32.

In step 116, the CPU 14A determines whether to end detection of a target with the clearance sonars 12. The determination determines, for example, whether a vehicle speed detected by the vehicle speed sensor 16 exceeds a predetermined vehicle speed, or whether an instruction to end detection of a target with the clearance sonars 12 is issued, or whether the ignition switch is turned off. When the determination is negative, the process returns to step 100, and the above-described process is repeated; whereas, when the determination is affirmative, a series of processing steps is ended.

In this way, in the present embodiment, the icon 32 is displayed in a size changed according to a detection result of a target and a distance to the detected target. Thus, a degree of urgency can be expressed by a change in the size of the icon 32, so it is possible to display a distance to a target in a stepwise manner and notify an occupant of the degree of urgency.

Particularly, since the icon 32 is displayed in a size such that the size of the icon 32 increases as a distance to the detected target reduces, an occupant is more easily notified of a degree of urgency.

Figure 7:
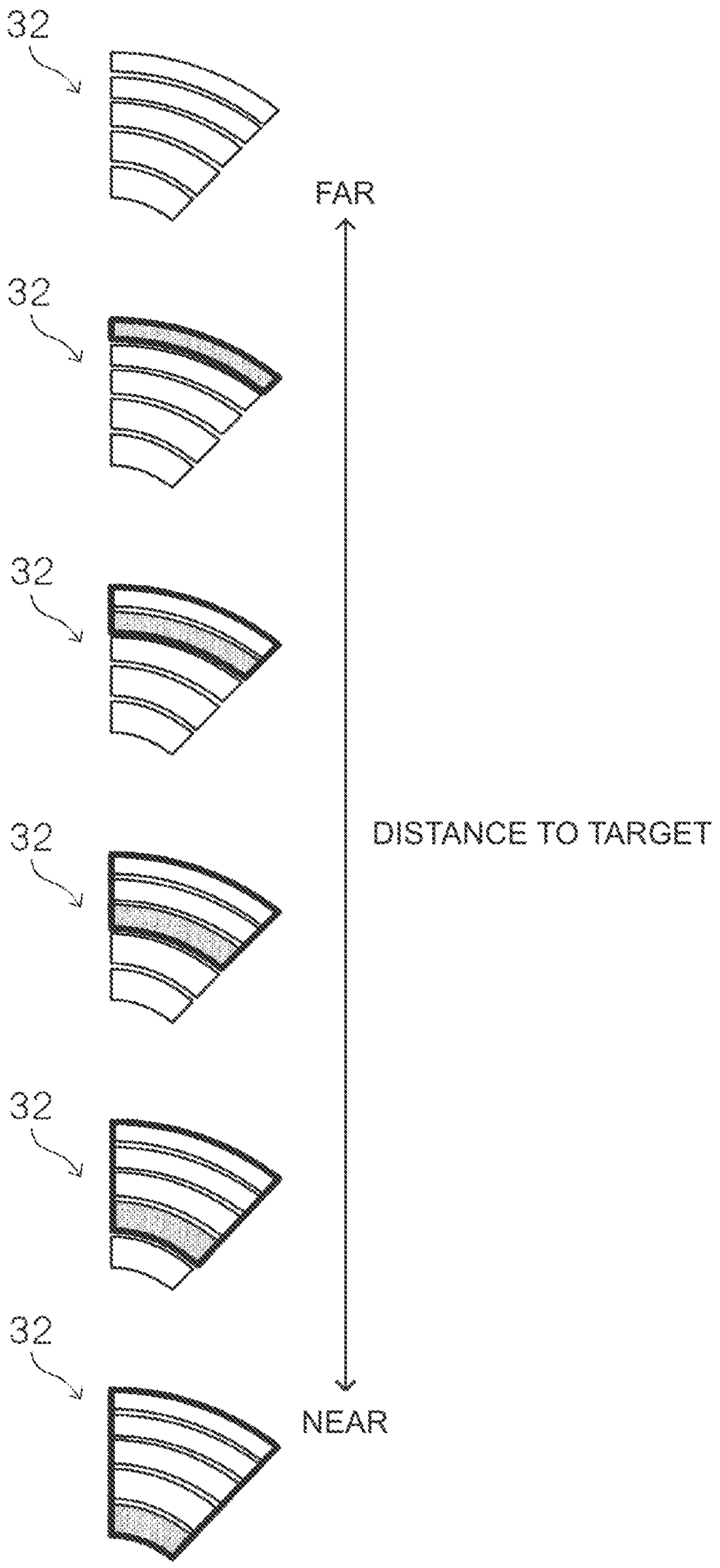
FIG. 7 is a view that shows a first modification of an icon.
Figure 8:
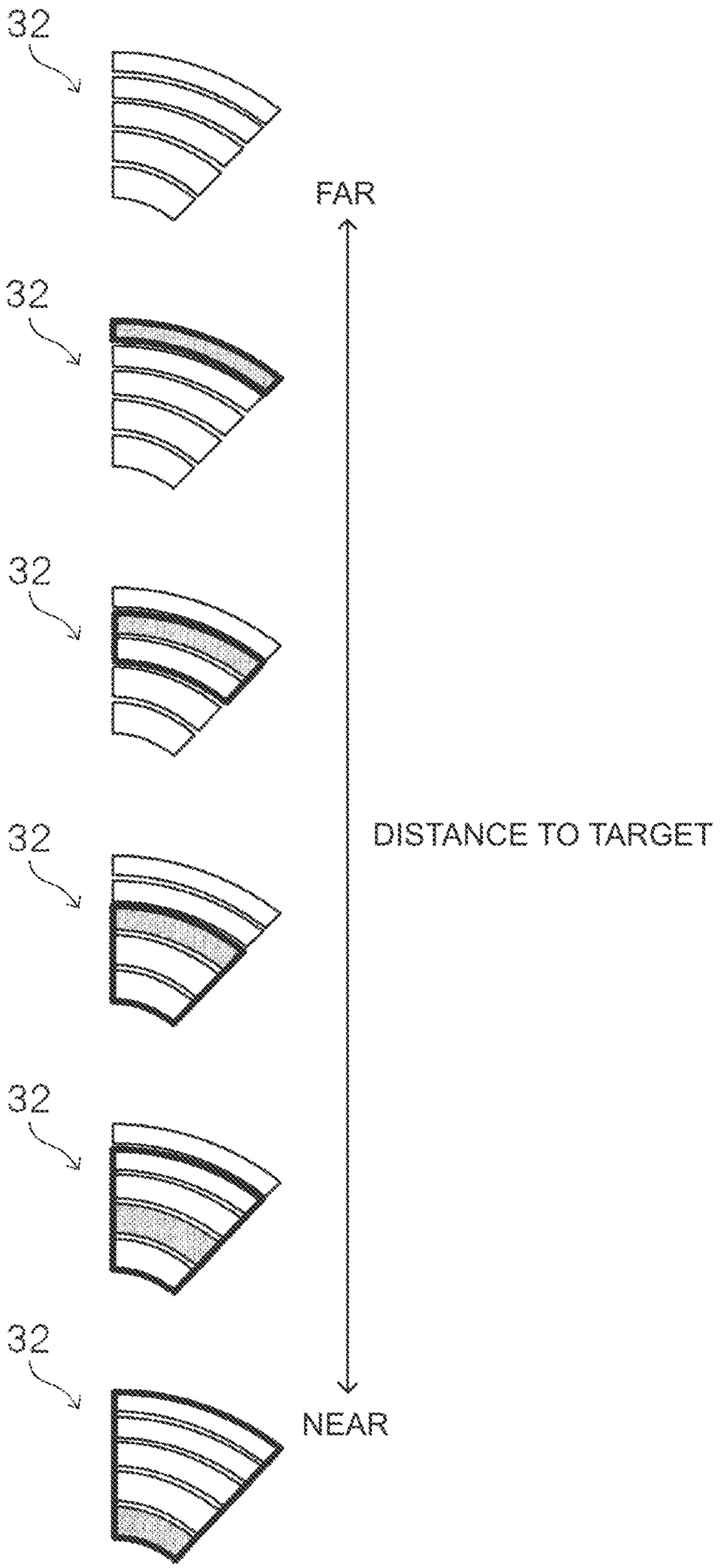
FIG. 8 is a view that shows a second modification of an icon.
Figure 9:
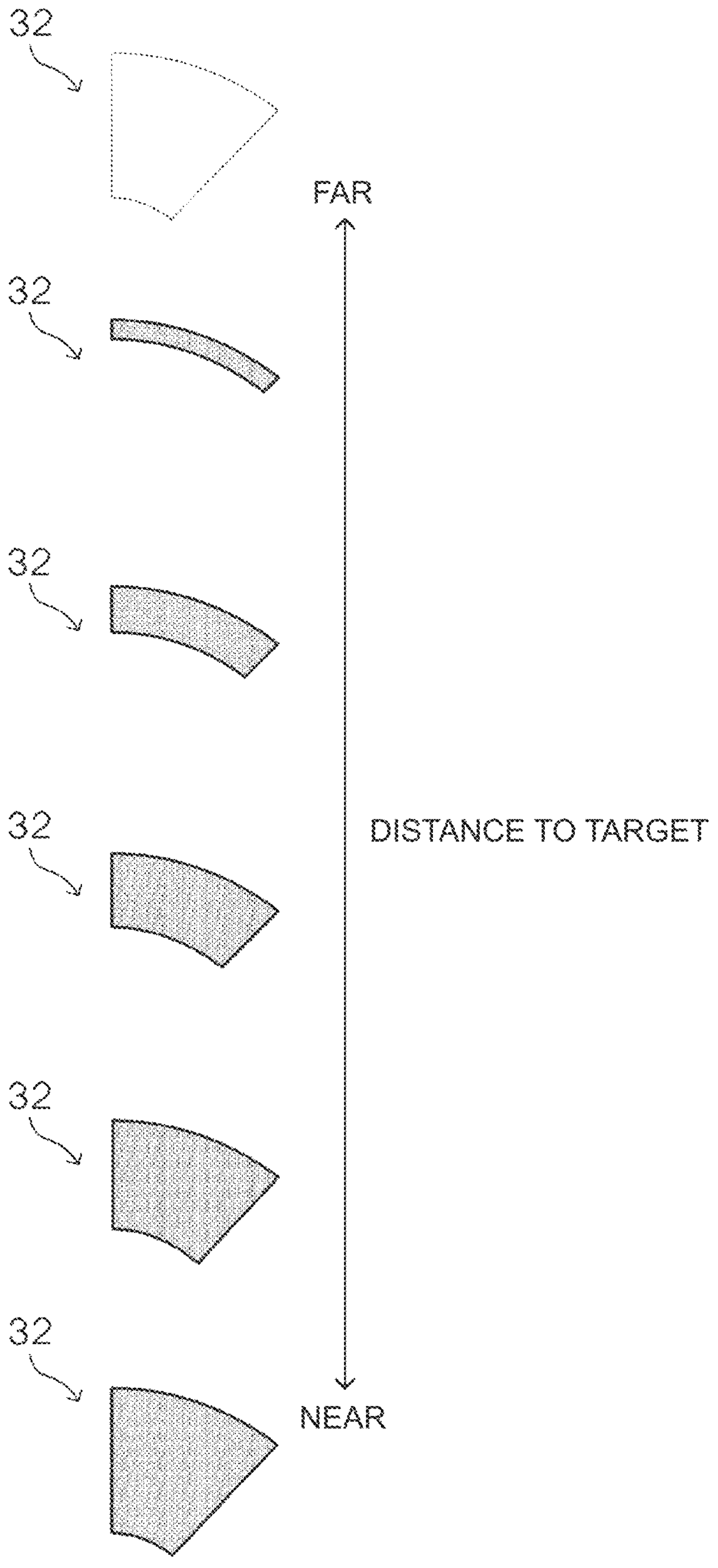
FIG. 9 is a view that shows a third modification of an icon.
Figure 10:
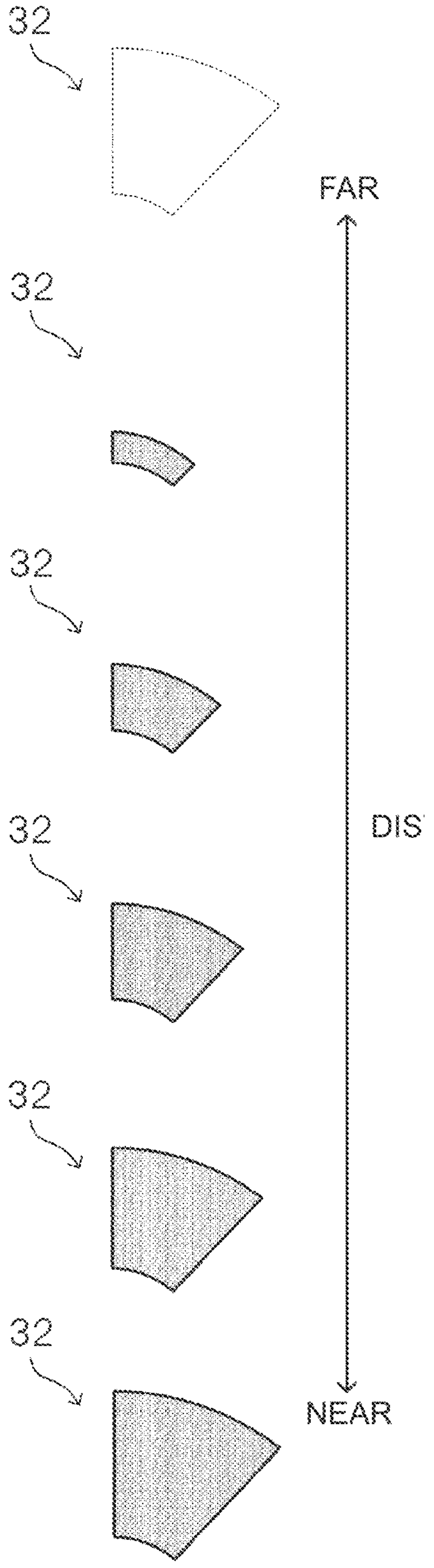
FIG. 10 is a view that shows a fourth modification of an icon.

Subsequently, modifications of the icon 32 will be described. FIG. 7 is a view that shows a first modification of the icon 32. FIG. 8 is a view that shows a second modification of the icon 32. FIG. 9 is a view that shows a third modification of the icon 32. FIG. 10 is a view that shows a fourth modification of the icon 32.

In the above-described embodiment, the icon 32 is displayed such that the area of the icon 32 increases as a distance to a detected target reduces; however, display of the icon 32 is not limited thereto.

For example, as in the case of the first modification shown in FIG. 7, and the second modification shown in FIG. 8, the icon 32 may be displayed in a filled state and a border (a frame indicated by the thick line in FIG. 7 and FIG. 8) enclosing the icon may be displayed such that the size of the border increases as a distance to a detected target reduces. With the thus configured icon 32, the presence of a target can be notified by displaying the icon 32, and a degree of urgency can be expressed by the size of the border enclosing the icon.

Specifically, the first modification shown in FIG. 7 shows an example in which circular arc figures closer to the host vehicle image 30 are displayed as a distance to a target reduces and a border (the thick line in FIG. 7) including the circular arc figures is displayed so as to increase in size by including the circular arc figures on a side to the host vehicle image 30.

The second modification shown in FIG. 8 shows an example in which circular arc figures closer to the host vehicle image 30 are displayed as a distance to a target reduces and a border (the thick line in FIG. 8) including the circular arc figures is displayed so as to increase in size by including another circular arc figure.

The thick line of the border and the circular arc figures to be displayed, shown in FIG. 7 and FIG. 8, may be displayed in a color closer to red as a distance to a target reduces and may be displayed in a color closer to yellow as the distance increases.

The number of circular arc figures to be displayed does not need to be changed. As in the case of the third modification of FIG. 9 and the fourth modification of FIG. 10, a substantially fan-shaped figure may be changed in size and displayed.

The third modification of FIG. 9 shows an example in which a substantially fan-shaped figure is displayed so as to increase in size toward the host vehicle image 30 (toward the lower side in FIG. 9) as a distance to a target reduces. In other words, in FIG. 9, a substantially fan-shaped figure is displayed so as to gradually increase in size from a side where the circular arc of the fan shape is large toward a side where the circular arc of the fan shape is small as a distance to a target reduces.

The fourth modification of FIG. 10 shows an example in which a substantially fan-shaped figure is displayed so as to increase in size toward a side opposite to the host vehicle image 30 (toward the upper side in FIG. 10) as a distance to a target reduces. In other words, in FIG. 10, conversely to FIG. 9, a substantially fan-shaped figure is displayed so as to gradually increase in size from a side where the circular arc of the fan shape is small toward a side where the circular arc of the fan shape is large as a distance to a target reduces.

Similarly to the third modification and the fourth modification, shown in FIG. 9 and FIG. 10, the fan-shaped figures may be displayed in a color closer to red as a distance to a target reduces and may be displayed in a color closer to yellow as the distance increases.

In the above-described embodiment, the interval of intermittent sound is changed as shown in FIG. 5 according to a changed size of the icon 32; however, the configuration is not limited thereto. A mode in which only the icon 32 is displayed is applicable. The presence or absence of emission of an alarm sound by the alarm 20 may be selectable.

Figure 11:
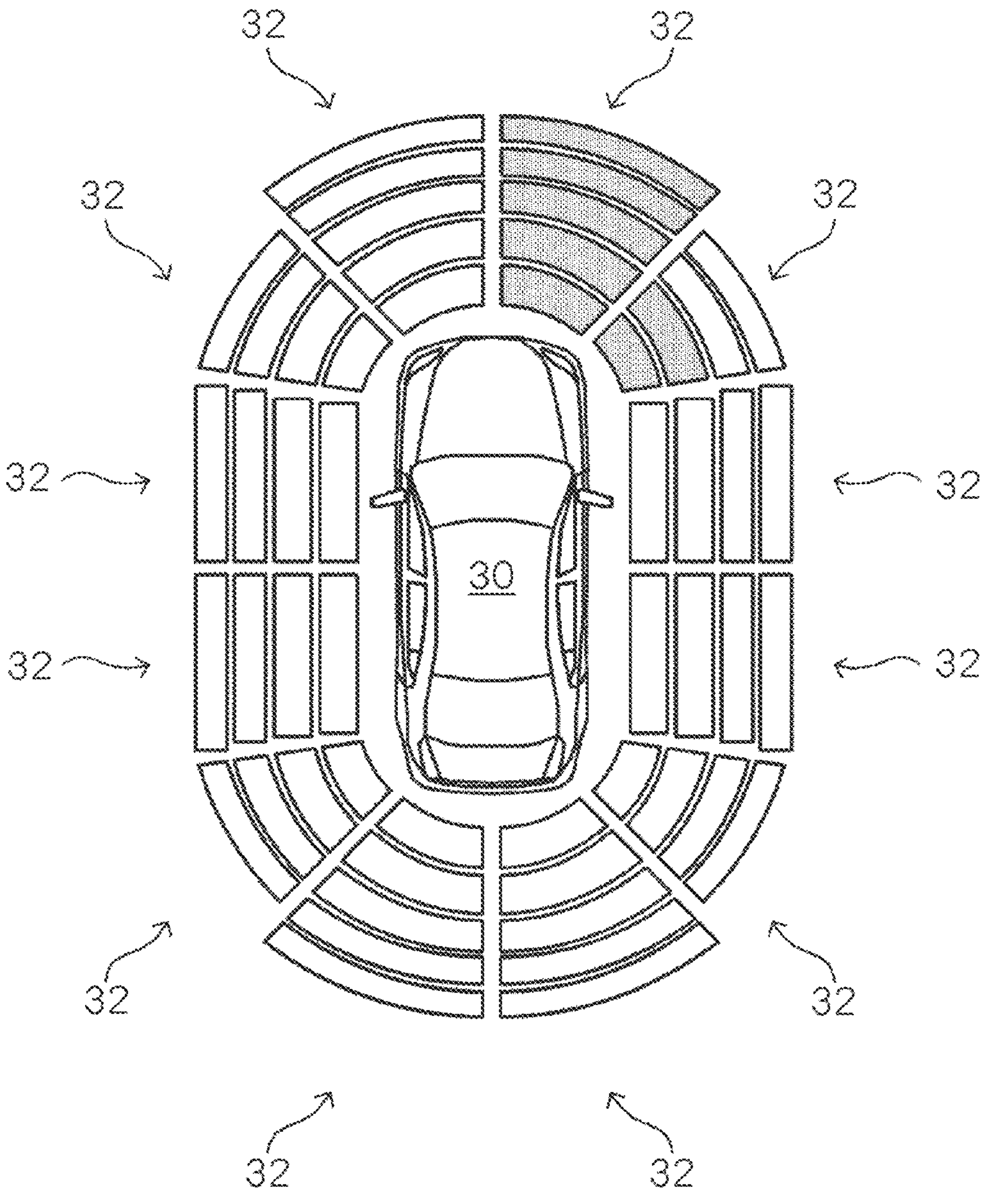
FIG. 11 is a view that shows an example in which two clearance sonars that detect a corresponding side are further provided on each of right and left sides and icons are also displayed on the sides of a host vehicle image.

In the above-described embodiment, the example in which the eight clearance sonars 12A, 12B, 12C, 12D, 12E, 12F, 12G, 12H are provided has been described; however, the number of the clearance sonars 12 is not limited to eight. For example, two clearance sonars 12 that detect a side may be further provided two by two on each side, and corresponding icons 32 may also be displayed on the sides of the host vehicle image 30 as shown in FIG. 11.

The process that is executed in the clearance sonar ECU 14 according to the embodiment has been described as software processing that is executed by running a program; however, the configuration is not limited thereto. The process may be executed by hardware, such as a graphics processing unit (GPU), an application specific integrated circuit (ASIC), and a field-programmable gate array (FPGA). Alternatively, the process may be executed by a combination of both software and hardware. When the process is executed by software, a program may be stored in various storage media and distributed.

The disclosure is not limited to the above-described embodiment and modifications and may be, of course, modified into various forms without departing from the scope of the disclosure.

What is claimed is:

1. A display control apparatus comprising:

a clearance sonar configured to acquire a detection result of a target around a host vehicle and a detection result of a distance from the host vehicle to the target;

an alarm configured to emit an alarm sound; and a controller including a processor configured to determine whether the clearance sonar has detected the target based on the detection result, when it is determined that the clearance sonar has detected the target, display a host vehicle image simulating the host vehicle and an icon indicating a place where the target around the host vehicle is present, a size of the icon being based on the detection result of the distance from the host vehicle to the target, and control the alarm such that the alarm outputs a sound based on the size of the icon, determine whether the target is still being detected by the clearance sonar, when it is determined that the target is still being detected by the clearance sonar, determine whether the distance from the host vehicle to the target has changed, and when it is determined that the distance from the host vehicle to the target has changed, display the icon indicating the place where the target around the host vehicle is present in which the size of the icon is changed according to the change in the distance from the host vehicle to the target, and control the alarm such that the alarm outputs a sound according to a changed size of the icon, wherein the icon is substantially fan-shaped displayed by at least one circular arc figure provided at a position corresponding to the clearance sonar around the host vehicle image simulating the host vehicle.

2. The display control apparatus according to claim 1, wherein when it is determined that the clearance sonar has detected the target, the controller is configured to display the icon in a filled state and display a border enclosing the icon such that the border increases in size as the distance reduces.

3. The display control apparatus according to claim 1, wherein when it is determined that the clearance sonar has detected the target, the controller is configured to display the icon such that an area of the icon increases as the distance reduces.

4. The display control apparatus according to claim 1, wherein when it is determined that the distance from the host vehicle to the target has changed, the controller is configured to further change a blinking rate of the icon according to the changed size of the icon.

5. The display control apparatus according to claim 4, wherein the controller is configured to increase the blinking rate as the distance reduces.

6. The display control apparatus according to claim 1, wherein when it is determined that the distance from the host vehicle to the target has changed, the controller is configured to change a color of the icon according to the changed size of the icon.

7. The display control apparatus according to claim 6, wherein the controller is configured to display a color indicating a higher degree of urgency as the distance reduces.

8. The display control apparatus according to claim 1, wherein when it is determined that the distance from the host vehicle to the target has changed, the controller is configured to control the alarm such that an interval of an intermittent sound reduces as the distance reduces.

9. A non-transitory computer-readable storage medium storing code causing a computer to execute a process, the process including controlling a clearance sonar to acquire a detection result of a target around a host vehicle and a detection result of a distance from the host vehicle to the target;

determining whether the clearance sonar has detected the target based on the detection result;

when it is determined that the clearance sonar has detected the target, displaying a host vehicle image simulating the host vehicle and an icon indicating a place where the target around the host vehicle is present, a size of the icon being based on the detection result of the distance from the host vehicle to the target, and controlling an alarm such that the alarm outputs a sound based on the size of the icon;

determining whether the target is still being detected by the clearance sonar;

when it is determined that the target is still being detected by the clearance sonar, determining whether the distance from the host vehicle to the target has changed; and when it is determined that the distance from the host vehicle to the target has changed, displaying the icon indicating the place where the target around the host vehicle is present in which the size of the icon is changed according to of the change in the distance from the host vehicle to the target, and controlling the alarm such that the alarm outputs a sound according to a changed size of the icon, wherein the icon is substantially fan-shaped displayed by at least one circular arc figure provided at a position corresponding to the clearance sonar around the host vehicle image simulating the host vehicle.

* * * * *